(12) United States Patent
Serizawa et al.

(10) Patent No.: US 10,634,216 B2
(45) Date of Patent: Apr. 28, 2020

(54) METAL RING AND MANUFACTURING METHOD FOR METAL RING

(71) Applicant: TOYOTA JIDOSHA KABUSHIKI KAISHA, Toyota-shi (JP)

(72) Inventors: Kazumi Serizawa, Toyota (JP); Koji Nishida, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 1034 days.

(21) Appl. No.: 15/092,178

(22) Filed: Apr. 6, 2016

(65) Prior Publication Data

US 2016/0290437 A1 Oct. 6, 2016

(30) Foreign Application Priority Data

Apr. 6, 2015 (JP) .................................. 2015-077984

(51) Int. Cl.

| *C21D 1/06* | (2006.01) |
| *C21D 9/40* | (2006.01) |
| *C23C 8/26* | (2006.01) |
| *F16G 5/16* | (2006.01) |
| *F16H 9/18* | (2006.01) |
| *C23C 8/02* | (2006.01) |
| *C21D 1/74* | (2006.01) |

(Continued)

(52) U.S. Cl.

CPC .............. *F16G 5/16* (2013.01); *B21D 53/14* (2013.01); *C21D 1/06* (2013.01); *C21D 1/74* (2013.01); *C21D 1/76* (2013.01); *C21D 9/40* (2013.01); *C23C 8/02* (2013.01); *C23C 8/26* (2013.01); *F16H 9/18* (2013.01); *C21D 2221/10* (2013.01)

(58) Field of Classification Search

CPC .. F16G 5/16; B21D 53/14; C21D 1/06; C21D 1/74; C21D 1/76; C21D 9/40; C23C 8/02; C23C 8/26; F16H 9/18

See application file for complete search history.

(56) References Cited

U.S. PATENT DOCUMENTS

| 4,698,050 A | 10/1987 | Hattori et al. |
| 6,550,122 B1 | 4/2003 | Imai et al. |

(Continued)

FOREIGN PATENT DOCUMENTS

| CN | 102308118 A | 1/2012 |
| JP | 61-266844 A | 11/1986 |

(Continued)

*Primary Examiner* — Daniel J. Schleis
*Assistant Examiner* — Kevin Ct Li
(74) *Attorney, Agent, or Firm* — Oblon, McClelland, Maier & Neustadt, L.L.P.

(57) ABSTRACT

A metal ring of a transmission belt in a belt-type continuously variable transmission. A first nitrided layer formed in a main surface of the metal ring, and a second nitrided layer formed in an end surface of the metal ring are included. A thickness of the second nitrided layer is smaller than a thickness of the first nitrided layer, and surface hardness of the end surface is higher than surface hardness of the main surface. Even though the second nitrided layer in the end part is thin, the surface hardness of the end surface is high. Therefore, it is possible to restrain fatigue fracture starting from an end part, and it is also possible to restrain deterioration of abrasion resistance of the end surface.

4 Claims, 7 Drawing Sheets

(51) Int. Cl.
   *B21D 53/14*    (2006.01)
   *C21D 1/76*    (2006.01)

(56) References Cited

U.S. PATENT DOCUMENTS

| | | | |
|---|---|---|---|
| 8,713,786 B2 * | 5/2014 | Adomi | C21D 9/40 148/230 |
| 2008/0009178 A1 | 1/2008 | Kanehara et al. | |
| 2008/0009378 A1 | 1/2008 | Kanehara et al. | |
| 2008/0017283 A1 | 1/2008 | Maruta et al. | |
| 2010/0189590 A1 * | 7/2010 | Ohishi | C22C 38/001 420/84 |
| 2011/0269591 A1 | 11/2011 | Adomi | |
| 2012/0241050 A1 | 9/2012 | Takagaki et al. | |
| 2014/0230968 A1 * | 8/2014 | Ohishi | C23C 8/26 148/318 |

FOREIGN PATENT DOCUMENTS

| | | | |
|---|---|---|---|
| JP | 03163242 A | 7/1991 |
| JP | 2004-162134 A | 6/2004 |
| JP | 2004-315869 A | 11/2004 |
| JP | 2007-154305 A | 6/2007 |
| JP | 2007-186780 A | 7/2007 |
| JP | 5053651 B2 | 10/2012 |
| JP | 2012-250266 A | 12/2012 |
| JP | 5146597 B2 | 2/2013 |
| WO | WO 2009/008071 A1 | 1/2009 |
| WO | WO 2011/043648 A1 | 4/2011 |
| WO | WO2011/077945 A1 | 6/2011 |
| WO | WO2011/135624 A1 | 11/2011 |
| WO | WO 2013/047078 A1 | 4/2013 |

\* cited by examiner

METAL RING AND MANUFACTURING METHOD FOR METAL RING

INCORPORATION BY REFERENCE

The disclosure of Japanese Patent Application No. 2015-077984 filed on Apr. 6, 2015 including the specification, drawings and abstract is incorporated herein by reference in its entirety.

BACKGROUND

1. Field

The disclosure relates to a metal ring and a manufacturing method for the metal ring, especially to a metal ring in a transmission belt of a belt-type continuously variable transmission, and a manufacturing method for the metal ring.

2. Description of Related Art

A steel belt-type continuously variable transmission (CVT), in which an input side pulley and an output side pulley are connected to each other by a steel-made transmission belt, is used in an automobile and so on. A transmission belt in the steel belt-type CVT has a structure in which a number of elements are lined up without space between them and attached to a metal ring laminate that is made from a plurality of thin-sheet metal rings laminated in a nested state. Tension of the metal ring laminate presses the elements against input-side and output-side pulleys, thereby transmitting power from the input-side pulley to the output-side pulley.

In order to ensure friction force between the elements and the input-side and output-side pulleys, high tension is applied to each of the metal rings that structure the metal ring laminate. Therefore, maraging steel, which is precipitation strengthened ultra high strength steel, is used for the metal rings. Also, repeated bending stress is also applied to the metal rings in a high tension state. Therefore, for the purpose of improving fatigue strength, nitriding is performed for giving compressive residual stress to surfaces of the metal rings.

In normal nitriding, uniform nitrided layers are formed in main surfaces (inner and outer peripheral surfaces) and end surfaces of the metal ring. Alternatively, the nitrided layers formed in the end surfaces (nitrided layers on end parts) become thicker than the nitrided layers formed in the main surfaces (nitrided layers in the main surface parts). When thicknesses of the nitrided layers in the end parts become large, residual tensile stress in non-nitrided parts on inner sides of the nitrided layers of the end parts becomes large, and there is thus a possibility that fatigue fracture starting from the end parts could happen easily.

In order to remove such a possibility, International Unexamined Patent Application No. 2011/135624 discloses a metal ring in which a thickness of a nitrided layer in an end part is reduced by forming a nitriding inhibition film on an end surface before nitriding. Because the thickness of the nitrided layer of the end part is reduced, fatigue fracture starting from the end part is restrained.

SUMMARY

The inventors found the following problem in terms of a metal ring that is used for a transmission belt in a belt-type continuously variable transmission, and a manufacturing method for the metal ring. Because one of end surfaces of a metal ring is in contact with elements, abrasion resistance is required. In the metal ring disclosed in International Unexamined Patent Application No. 2011/135624, since the thickness of the nitrided layer in the end part is reduced, surface hardness of the end surface is reduced, and, as a result, abrasion resistance of the end surface could be deteriorated.

An aspect of the disclosure restrains fatigue fracture starting from an end part, and restrains deterioration of abrasion resistance of an end surface.

A metal ring according to an aspect of the disclosure is a metal ring of a transmission belt in a belt-type continuously variable transmission. The metal ring includes a first nitrided layer formed in a main surface of the metal ring, and a second nitrided layer formed in an end surface of the metal ring. A thickness of the second nitrided layer is smaller than a thickness of the first nitrided layer, and surface hardness of the end surface of the metal ring is higher than surface hardness of the main surface of the metal ring.

In the metal ring according to the aspect of the disclosure, since the thickness of the second nitrided layer is smaller than the thickness of the first nitrided layer, it is possible to restrain fatigue fracture starting from the end part. Also, surface hardness of the end surface is higher than surface hardness of the main surface. In short, even though the second nitrided layer of the end part is thin, surface hardness of the end surface is high. Therefore, it is possible to restrain fatigue fracture starting from the end part, and it is also possible to restrain deterioration of abrasion resistance of the end surface.

The metal ring may contain maraging steel containing nitrogen-affinitive metal that does not precipitate during aging treatment. Further, Cr may be contained as the nitrogen-affinitive metal. Thus, it is possible to manufacture the metal ring easily and inexpensively.

The main surface of the metal ring may include an outer peripheral surface of the metal ring, and an inner peripheral surface of the metal ring.

A manufacturing method for a metal ring according to an aspect of the disclosure is a manufacturing method for a metal ring of a transmission belt in a belt-type continuously variable transmission. The manufacturing method includes forming a concentrated layer in a main surface of a material of the metal ring, in which nitrogen-affinitive metal is concentrated in the concentrated layer, removing the concentrated layer, thereby exposing a depletion layer on the main surface, in which nitrogen-affinitive metal is deficient in the depletion layer, exposing a bulk layer on an end surface of the metal ring after the concentrated layer is formed, and nitriding the metal ring in which the depletion layer is exposed on the main surface and the bulk layer is exposed on the end surface.

In the manufacturing method for the metal ring according to the aspect of the disclosure, a concentration of the nitrogen-affinitive metal in the end surface is higher than a concentration of the nitrogen-affinitive metal in the main surface. Since the concentration of the nitrogen-affinitive metal is high in the end surface, a lot of nitrogen atoms are trapped due to nitriding, thus achieving the second nitrided layer that is thin but also hard. Therefore, it is possible to restrain fatigue fracture starting from the end part, and it is also possible to restrain deterioration of abrasion resistance in the end surface.

The manufacturing method may further include performing aging treatment of the metal ring in which the depletion layer is exposed on the main surface and the bulk layer is exposed on the end surface, before nitriding, and the metal ring may contain maraging steel containing the nitrogen-affinitive metal that does not precipitate during the aging treatment. Also, Cr may be contained as the nitrogen-affinitive metal. Thus, it is possible to manufacture the metal ring easily and inexpensively.

The main surface may include an outer peripheral surface of the metal ring and an inner peripheral surface of the metal ring.

According to the aspect of the disclosure, it is possible to restrain fatigue fracture starting from the end part, and it is also possible to restrain deterioration of abrasion resistance of the end surface.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Herein below, specific embodiments, to which the claimed invention is applied, are explained in detail with reference to the drawings. This does not mean, however, that the claimed invention is limited to the following embodiments. In order to explain clearly, the description and drawings below are simplified as necessary.

Figure 1:
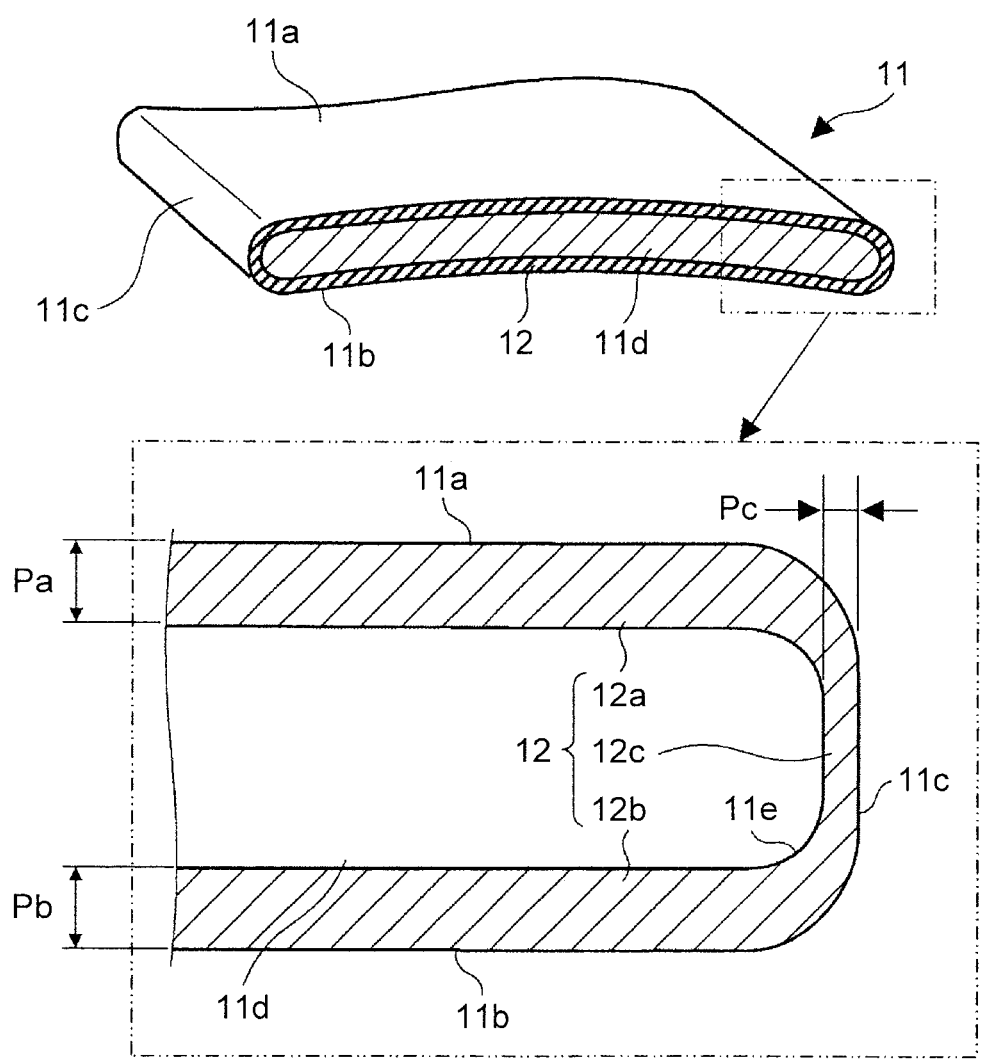
FIG. 1 is a sectional view of a metal ring according to the first embodiment.
Figure 2:
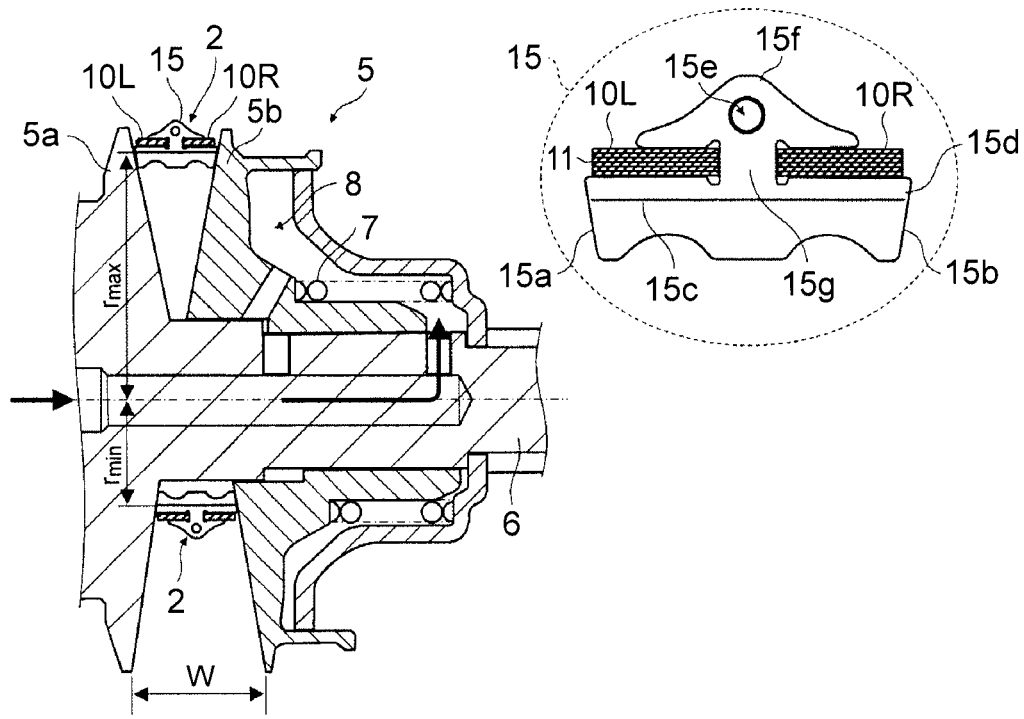
FIG. 2 is a sectional view of a belt-type continuously variable transmission to which the metal ring according to the first embodiment is applied.
Figure 3:
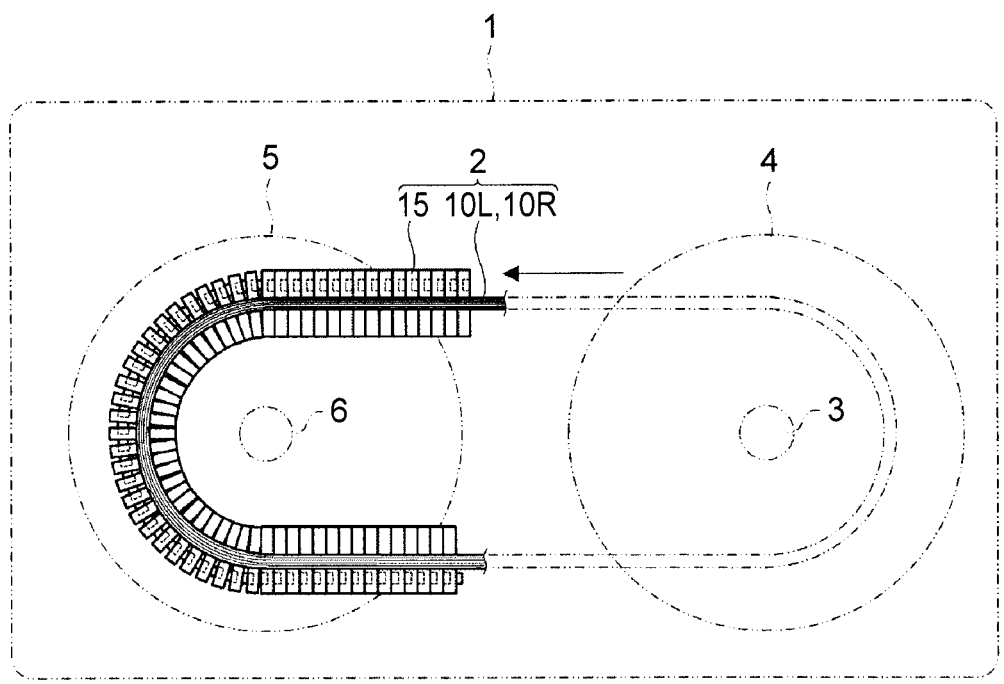
FIG. 3 is a side view of the belt-type continuously variable transmission to which the metal ring according to the first embodiment is applied.

(The first embodiment) First of all, with reference to FIG. 1 to FIG. 3, a metal ring according to the first embodiment is explained. FIG. 1 is a sectional view of the metal ring according to the first embodiment. FIG. 2 is a sectional view of a belt-type continuously variable transmission to which the metal ring according to the first embodiment is applied. FIG. 3 is a side view of the belt-type continuously variable transmission to which the metal ring according to the first embodiment is applied.

<Structure of the metal ring> First of all, the metal ring 11 according to this embodiment is explained. The metal ring 11 according to this embodiment is a belt-like member made from a sheet metal. As shown in an upper side of FIG. 1, the metal ring 11 has nitrided layers 12 in surfaces, namely, an outer peripheral surface 11a, an inner peripheral surface 11b, and both end surfaces 11c, in its section. In other words, an outer edge of a non-nitrided part 11d, which is a bulk layer, is entirely surrounded by the nitrided layers 12. The metal ring 11 is curved gently so that a center part of the metal ring 11 in a width direction projects slightly to the outer peripheral surface 11a side from both end parts in the width direction.

As shown in an partial enlarged view on a lower side in FIG. 1, the nitrided layers 12 include first nitrided layers 12a, 12b, which are formed in the outer peripheral surface 11a and the inner peripheral surface 11b of the metal ring 11, respectively, and second nitrided layers 12c formed in both end surfaces 11c of the metal ring 11.

Here, in the metal ring 11 according to this embodiment, a thickness Pc of the second nitrided layer 12c is smaller than thicknesses Pa, Pb of the first nitrided layers 12a, 12b. Since the second nitrided layers 12c of the end parts are thin, it is possible to restrain an increase in residual tensile stress in the non-nitrided part 11d on inner sides of the second nitrided layers 12c, thereby restraining fatigue fracture starting from the end parts. It is possible to measure the thicknesses Pa to Pc of the nitrided layers by microstructure observation after nital etching.

Further, in the metal ring 11 according to this embodiment, surface hardness of the end surfaces 11c, in which the second nitrided layers 12c are formed, is higher than surface hardness of the main surfaces (the outer peripheral surface 11a and the inner peripheral surface 11b), in which the first nitrided layers 12a, 12b are formed. As stated above, since the surface hardness of the end surfaces 11c is high, it is possible to restrain deterioration of abrasion resistance of the end surfaces 11c. The surface hardness can be measured by, for example, Micro Vickers hardness testing. Even though the thickness Pc of the second nitrided layer 12c is smaller than the thicknesses Pa, Pb of the first nitrided layers 12a, 12b, surface hardness of the end surface 11c is higher than surface hardness of the outer peripheral surface 11a and the inner peripheral surface 11b, and the reason is described later.

As stated above, in the metal ring 11 according to this embodiment, the thickness Pc of the second nitrided layer 12c is smaller than the thicknesses Pa, Pb of the first nitrided layers 12a, 12b, and the surface hardness of the end surfaces 11c is higher than the surface hardness of the outer peripheral surface 11a and the inner peripheral surface 11b. In short, even though the second nitrided layers 12c of the end parts are thin, the surface hardness of the end surfaces 11c is large, and it is thus possible to restrain fatigue fracture starting from the end parts, and it is also possible to restrain deterioration of abrasion resistance of the end surfaces 11c.

Further, the nitrided layer 12 has four chamfered parts in which surfaces are curved between the second nitrided layers 12c and the first nitrided layers 12a, 12b, respectively, and, in the chamfered parts, the thicknesses Pc of the second nitrided layers 12c become larger towards the first nitrided layers 12a, 12b. Further, a radius of curvature of a surface of each of the chamfered parts of the metal ring 11 is larger than the thicknesses Pa to Pc of the nitrided layers.

The metal ring 11 is made from, for example, maraging steel. Maraging steel is precipitation strengthened ultra high strength steel, in which Ni (nickel), Co (cobalt), Mo (molybdenum), Ti (titanium), Al (aluminum), and so on are added with a carbon concentration of 0.03 percent by mass or lower, and high strength and toughness are obtained by aging treatment. A composition of maraging steel is not particularly limited, but contains, for example, about 18 percent by mass of Ni, about 10 percent by mass of Co, about 5 percent by mass of Mo, and about 1 percent by mass in total of Ti and Al.

It is preferred that maraging steel, which structures the metal ring 11 according to this embodiment, further contains nitrogen-affinitive metal that does not precipitate during aging treatment. The nitrogen-affinitive metal is a metallic element that has a higher chemical affinity with nitrogen than Fe (iron). As the nitrogen-affinitive metal, Ti, Al, Cr (chrome), and so on may be included. Among them, Ti and Al precipitate during aging treatment, and Cr does not precipitate during aging treatment. Therefore, it is preferred that the metal ring 11 according to this embodiment is made from maraging steel containing Cr. A concentration of Cr is preferably between 0.5~1.5 percent by mass.

The nitrogen-affinitive metal, which does not precipitate during aging treatment, works as a trap site for nitrogen atoms during nitriding in the following process. In the metal ring 11 according to this embodiment, a concentration of such nitrogen-affinitive metal in a surface layer of the end surface 11c is higher than a concentration of the nitrogen-affinitive metal in surface layers of the main surfaces, namely, the outer peripheral surface 11a and the inner peripheral surface 11b. In short, since the concentration of the nitrogen-affinitive metal is high in the surface layer of the end surface 11c, many nitrogen atoms are trapped, thereby achieving thin and hard the second nitrided layer 12c. At the same time, in the surface layers of the outer peripheral surface 11a and the inner peripheral surface 11b, since the concentration of the nitrogen-affinitive metal is low, nitrogen atoms enter inside easily, thereby enabling the first nitrided layers 12a, 12b to have a larger thickness and smaller hardness than the second nitrided layer 12c.

As a result, in the metal ring 11 according to this embodiment, while the thickness Pc of the second nitrided layer 12c is made smaller than the thicknesses Pa, Pb of the first nitrided layers 12a, 12b, it is possible to make surface hardness of the end surface 11c higher than surface hardness of the outer peripheral surface 11a and the inner peripheral surface 11b. In short, it is possible to give the end surface 11c high surface hardness even through the second nitrided layer 12c of the end part is thin. Therefore, it is possible to restrain fatigue fracture starting from the end part, and also restrain deterioration of abrasion resistance of the end surface 11c.

<Structure of the belt-type continuously variable transmission to which the metal ring is applied> Next, with reference to FIG. 2 and FIG. 3, a belt-type continuously variable transmission 1, to which the metal ring 11 according to this embodiment is applied, is explained. As shown in FIG. 2 and FIG. 3, a plurality of (for example about ten) metal rings 11 having slightly different circumferences from each other are laminated in a nested state, thereby structuring a pair of left and right metal ring laminates 10L, 10R. As shown in FIG. 3, a number of (for example, about 400) elements 15 are lined up without spaces between them and attached to the pair of metal ring laminates 10L, 10R, thereby structuring a transmission belt 2. A plate thickness direction of the elements 15 coincides with a circumferential direction of the metal ring laminates 10L, 10R.

As shown in an enlarged view in FIG. 2, the element 15 is structured from a body 15d, a head 15f, and a neck 15g that connects the body 15d and the head 15f with each other in a center part in the width direction. The body 15d has an end surface parts 15a, 15b engaged with an input side pulley 4 and an output side pulley 5, and a locking edge part 15c.

In the head 15f, a projecting and recessed engagement part 15e is formed, which is engaged with each other through projections and recesses in the lamination direction. On both sides of the neck 15g, the pair of metal ring laminates 10L, 10R are inserted between the body 15d and the head 15f.

As shown in FIG. 3, the transmission belt 2 made from the metal ring laminates 10L, 10R and a number of elements 15 is wound around the input side pulley 4 and the output side pulley 5. In two curved sections of the transmission belt 2, the elements 15 are pressed against the input side pulley 4 and the output side pulley 5 due to tension of the metal ring laminates 10L, 10R. Therefore, it is possible to transmit power from the input side pulley 4 to the output side pulley 5.

As shown in FIG. 3, the belt-type continuously variable transmission 1 includes the input side pulley 4 connected with an input shaft 3, the output side pulley 5 connected with an output shaft 6, and the transmission belt 2 for power transmission, which is wound around the input side pulley 4 and the output side pulley 5. In the belt-type continuously variable transmission 1, power is inputted into the input shaft 3 through a clutch and a torque converter from an engine of a vehicle (not shown). Meanwhile, power is outputted to left and right driving wheels through a reduction gear mechanism and a differential gear unit (not shown) from the output shaft 6.

As shown in FIG. 2, the output side pulley 5 has a fixed-side sheave member 5a fixed to the output shaft 6, and the movable-side sheave member 5b supported by the output shaft 6 to be able to be displaced in an axial direction. A generally V-shaped groove is formed between the fixed-side sheave member 5a and the movable-side sheave member 5b, and a groove width W can be changed. A compression coil spring 7 and a hydraulic actuator 8 are attached to the output side pulley 5. The compression coil spring 7 biases the movable-side sheave member 5b in a downshift direction in which the groove width W of the output side pulley 5 is reduced. The hydraulic actuator 8 applies hydraulic pressure on a back surface side of the movable-side sheave member 5b, thus displacing the movable-side sheave member 5b in the axis direction. With such a structure, it is possible to change a winding radius r of the transmission belt 2 with respect to the output side pulley 5 within a range between a minimum radius r min and a maximum radius r max.

The input side pulley 4 has a structure that is generally the same as that of the output side pulley 5 except the fact a biasing member like the compression coil spring 7 is not provided. Although not depicted in detail, the input side pulley 4 has a fixed-side sheave member fixed to the input shaft 3, and a movable-side sheave member that is supported by the input shaft 3 so as to be able to be displaced in an axis direction and form a generally V-shaped groove between the movable-side sheave member and the fixed-side sheave member. Further, the input side pulley 4 has a hydraulic actuator that is able to bias the movable-side sheave member in an upshift direction.

Figure 4:
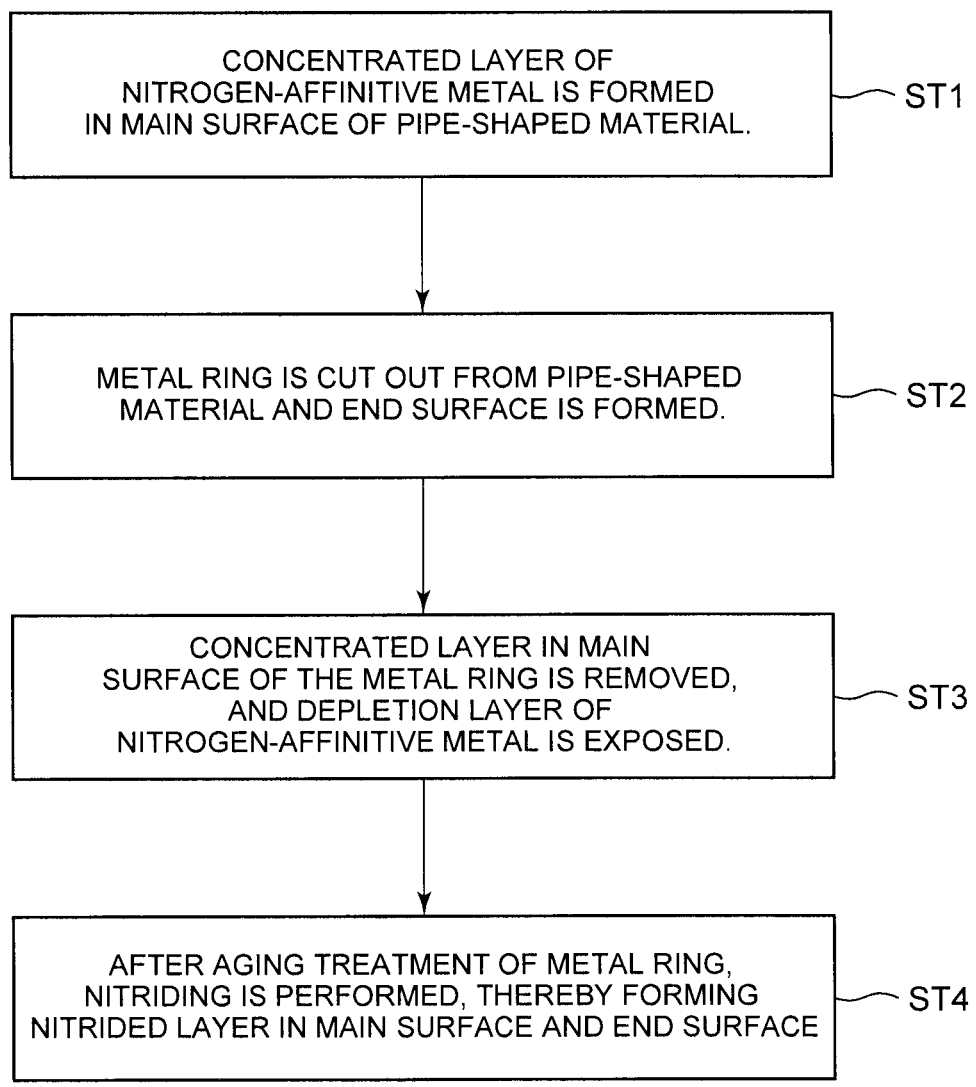
FIG. 4 is a flowchart showing a manufacturing method for the metal ring according to the first embodiment.
Figure 5:
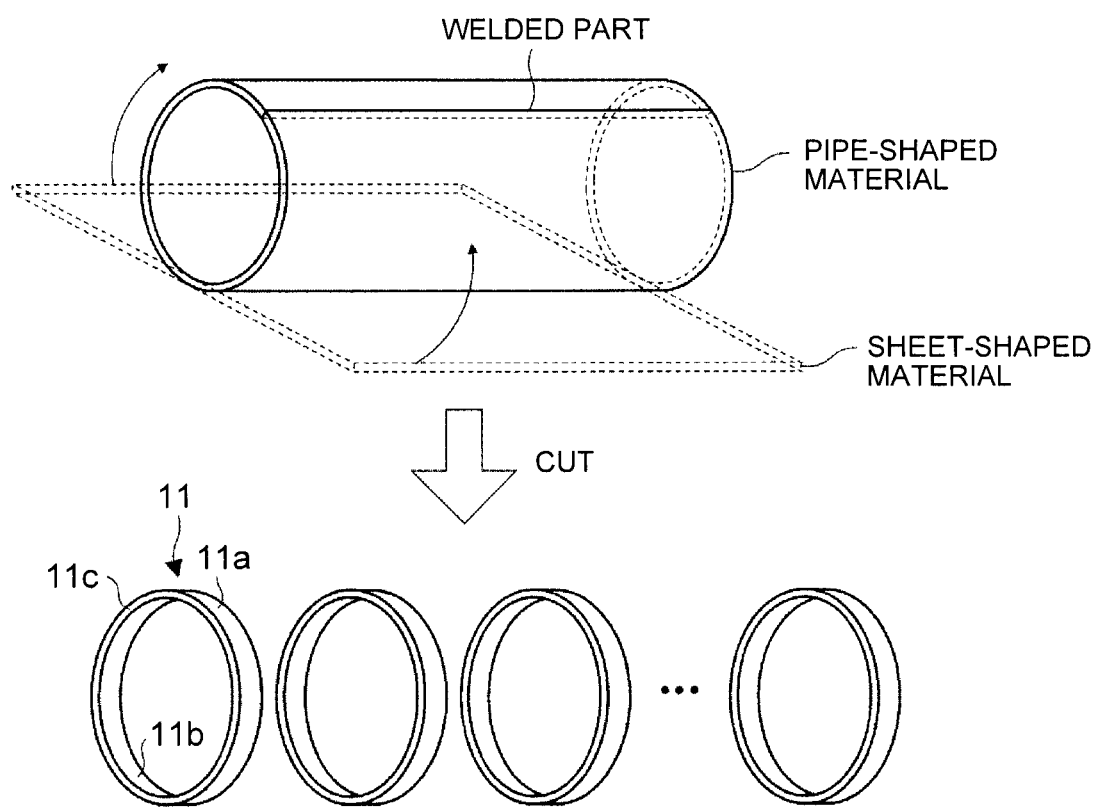
FIG. 5 is a perspective view showing the manufacturing method for the metal ring according to the first embodiment.

<Manufacturing method for the metal ring> Next, with reference to FIG. 4 and FIG. 5, a manufacturing method for the metal ring according to the first embodiment is explained. FIG. 4 is a flowchart showing the manufacturing method for the metal ring according to the first embodiment. FIG. 5 is a perspective view showing the manufacturing method for the metal ring according to the first embodiment.

First of all, as shown in FIG. 4, a concentrated layer having a higher concentration of the nitrogen-affinitive metal than that of the bulk layer is formed in the main surface (the outer peripheral surface and the inner peripheral surface) of the pipe-shaped material, which is a material for the metal ring (step ST1). Specifically, it is possible to form the concentrated layer of the nitrogen-affinitive metal by performing annealing in a reduced-pressure atmosphere or a non-oxidizing atmosphere such as an inert gas atmosphere of nitrogen gas or argon gas at temperature around 820~900° C. for about 60 minutes. As stated later, since the concentrated layer is removed, it is preferred that the concentrated layer is about 2 μm or smaller.

Here, the nitrogen-affinitive metal is also oxygen-affinitive metal. Therefore, by performing annealing in a non-oxidizing atmosphere, nitrogen-affinitive metal inside the pipe-shaped material is diffused towards a surface on which oxygen is absorbed. Thus, it is possible to form a concentrated layer of the nitrogen-affinitive metal in the main surface (the outer peripheral surface and the inner peripheral surface) of the pipe-shaped material. At the same time, along with formation of the concentrated layer, a depletion layer is formed on an inner side of the concentrated layer. In the depletion layer, a concentration of the nitrogen-affinitive metal is lower than that of the bulk layer.

When annealing is performed in an oxidizing atmosphere, oxygen does not stay in the surface of the pipe-shaped material and is diffused rapidly towards inside. Therefore, the concentrated layer of the nitrogen-affinitive metal is not formed near the surface. Meanwhile, even in the non-oxidizing atmosphere, when an amount of oxygen is too small in the atmosphere, the concentrated layer of the nitrogen-affinitive metal is not formed. Therefore, it is preferred that an atmosphere for annealing is managed based on understanding of partial pressure of oxygen and a dew point with which a desired concentrated layer is formed. As an example, it is preferred that annealing is performed in an atmosphere which is obtained by adding hydrogen gas of about 1 to 3 volume percentage to a nitrogen gas, with a dew point of about −10~0° C.

As shown in an upper side of FIG. 5, it is possible to manufacture the pipe-shaped material easily by welding end surfaces of a sheet-shaped material to each other. Annealing in step ST1 also has an effect of homogenizing a welded part. As a matter of course, the pipe-shaped material is not limited to such a welded pipe and may also be a seamless pipe.

Figure 6:
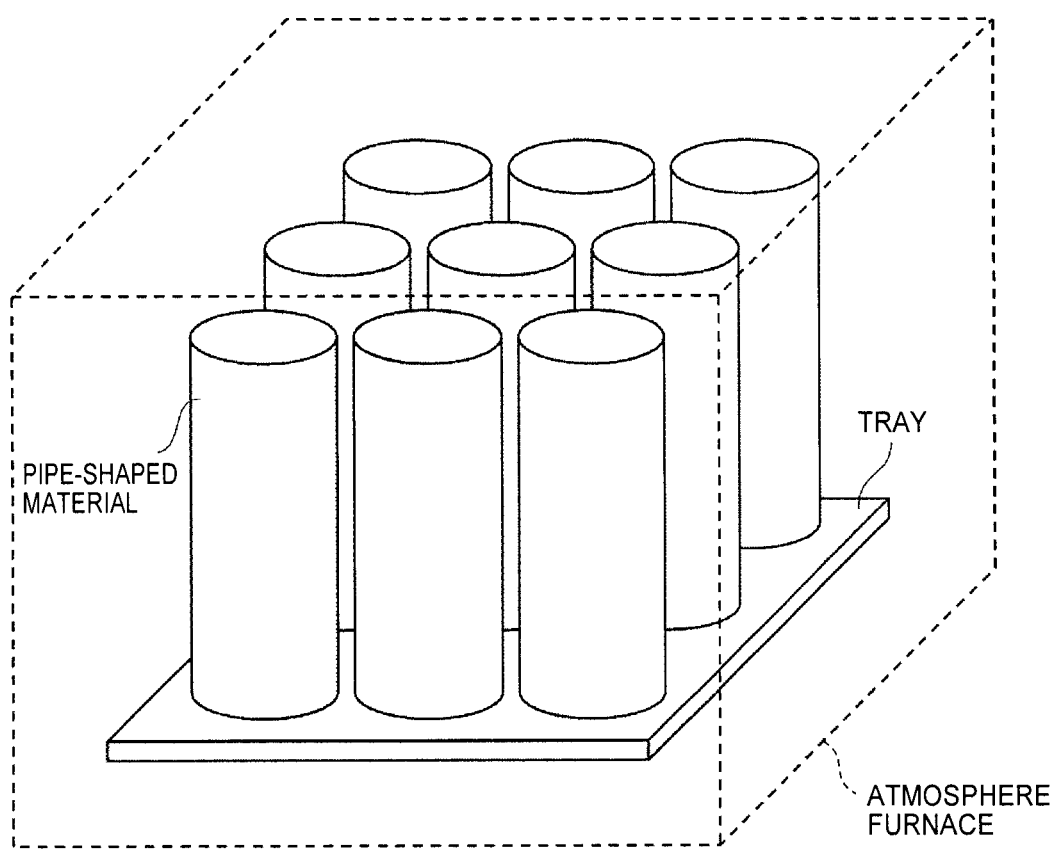
FIG. 6 is a perspective view schematically showing how annealing is performed on pipe-shaped materials inside an atmosphere furnace.

FIG. 6 is a perspective view schematically showing how annealing of the pipe-shaped materials is performed inside an atmosphere furnace. As shown in FIG. 6, it is preferred that the pipe-shaped materials are aligned in an erected state at about equal intervals on a tray, and the annealing is performed inside an atmosphere furnace.

Figure 7:
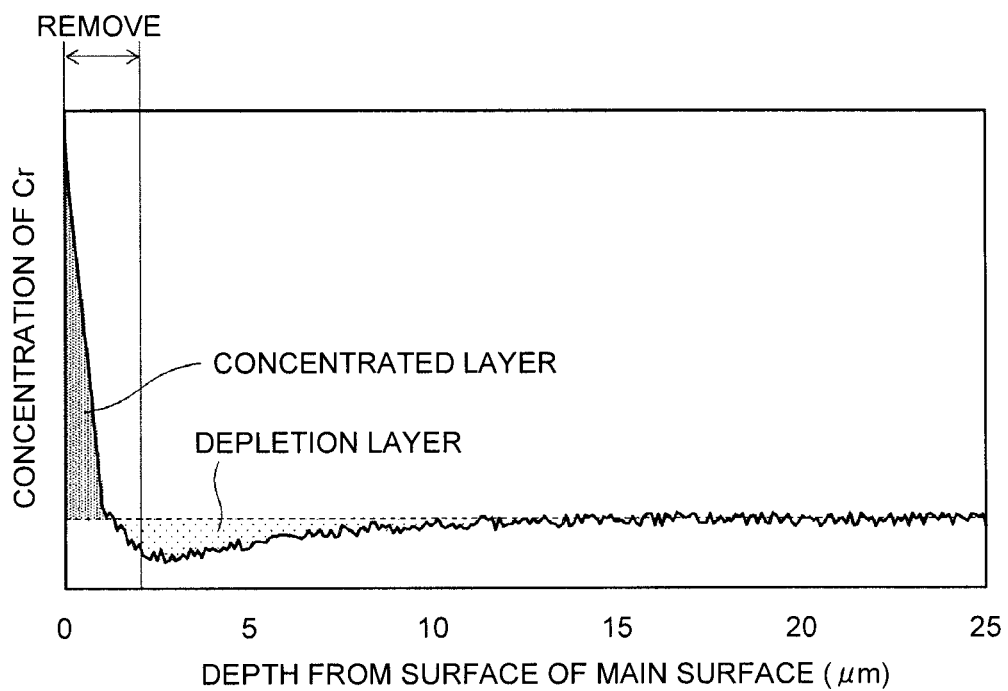
FIG. 7 is a graph showing a result of depth profiling of Cr by a glow discharge emission spectrophotometer, in a sample in which a concentrated layer of Cr, which is nitrogen-affinitive metal, is formed.

FIG. 7 is a graph showing a result of depth profiling of Cr by using a glow discharge emission spectrophotometer, in a sample in which a concentrated layer of Cr, which is the nitrogen-affinitive metal, is formed. The sample is made from maraging steel to which Cr of 1 percent by mass is added as the nitrogen-affinitive metal. In an atmosphere, which is obtained by adding hydrogen gas of 2 volume percentage to nitrogen gas with a dew point of −5° C., annealing was performed at 880° C. for 60 minutes. The dew point was adjusted to −5° C. by mixing nitrogen gas with a dew point of +10° C. into nitrogen gas with a dew point of −40° C. As shown in FIG. 7, a concentrated layer with a depth (thickness) of 1~2 μm is formed. Also, a depletion layer with a depth (thickness) of about 10 μm is formed on an inner side of the concentrated layer.

Next, as shown in FIG. 4, the metal rings 11 are cut out from the pipe-shaped material, and the end surfaces 11c are formed (step ST2). Thus, the bulk layer is exposed on the end surfaces 11c. This situation is shown on a lower side of FIG. 5. The concentrated layer is formed by step ST1 near surfaces of the outer peripheral surface 11a and the inner peripheral surface 11b, which are the main surfaces of the metal ring 11. Meanwhile, the bulk layer is exposed on the end surfaces 11c obtained by step ST2 after step ST1, and the concentrated layer and the depletion layer on the inner side of the concentrated layer are not formed near the surfaces of the end surfaces 11c. In step ST2, the bulk layer may be exposed on the end surfaces in other way than cutting. For example, after forming the concentrated layer on the surfaces (the outer peripheral surface 11a, the inner peripheral surface 11b, and the end surfaces 11c) of the metal ring 11, which is formed from a ribbon-like sheet-shaped material (step ST1), the bulk layer may be exposed on the end surfaces 11c by polishing the end surfaces 11c and so on.

Next, as shown in FIG. 4, the concentrated layer of the nitrogen-affinitive metal, which is formed in the outer peripheral surface 11a and the inner peripheral surface 11b that are the main surfaces of the metal ring 11, is removed, thereby exposing the depletion layer of the nitrogen-affinitive metal (step ST3). As a result, a concentration of the nitrogen-affinitive metal near the surface layers of the end surfaces 11c, where the bulk layer is exposed, becomes higher than the concentration of the nitrogen-affinitive metal near the surface layers of the main surfaces, namely, the outer peripheral surface 11a and the inner peripheral surface 11b.

Specifically, it is possible to remove the concentrated layer by barrel polishing. Burrs caused by cutting in step ST2 can also be removed by barrel polishing. The chamfered parts at four corners are also formed by barrel polishing. A method for removing the concentrated layer is not limited to barrel polishing, and may be grindstone polishing and brushing. A method for removing the concentrated layer is not limited to a mechanical removal method such as polishing, and may also be a chemical removal method such as etching. The order of step ST3 and step ST2 may be switched.

In the example shown in FIG. 7, the concentrated layer was removed by approximately 2 μm from the surfaces by barrel polishing. This made it possible to expose the depletion layer.

Finally, as shown in FIG. 4, after aging treatment of the metal ring 11, nitriding is performed (step ST4). As a result, the first nitrided layers 12a, 12b are formed in the outer peripheral surface 11a and the inner peripheral surface 11b of the metal ring 11, and the second nitrided layers 12c are formed in both end surfaces 11c.

As stated above, due to step ST3, the concentration of the nitrogen-affinitive metal in the surface layers of the end surfaces 11c is higher than the concentration of the nitrogen-affinitive metal in the surface layers of the main surfaces, namely, the outer peripheral surface 11a and the inner peripheral surface 11b. Therefore, in the nitriding in step ST4, a lot of nitrogen atoms are trapped by the nitrogen-affinitive metal near the surface layers of the end surfaces 11c, thereby achieving the thin and hard second nitrided layers 12c. At the same time, nitrogen atoms enter inside easily near the surface layers of the outer peripheral surface 11a and the inner peripheral surface 11b. Thus, the first nitrided layers 12a, 12b, which have larger thicknesses and smaller hardness than the second nitrided layers 12c, are obtained.

As a result, in the metal ring 11 according to this embodiment, it is possible to make surface hardness of the end surfaces 11c higher than surface hardness of the outer peripheral surface 11a and the inner peripheral surface 11b, while making the thicknesses Pc of the second nitrided layers 12c smaller than the thicknesses Pa, Pb of the first nitrided layers 12a, 12b.

It is preferred that aging treatment is performed, for example, in a nitrogen atmosphere or a reducing atmosphere at temperature of about 450~500° C. for about 90~180 minutes. It is preferred that nitriding is performed in an atmosphere made from 5~15 volume percentage of ammonia gas, 1~3 volume percentage of hydrogen gas, and the remainder nitrogen gas, at temperature of about 400~450° C. for about 40~120 minutes. Hydrogen gas in the atmosphere is generated by thermal decomposition of ammonia gas.

It is preferred that the following treatments are performed after step ST3 and before step ST4. It is preferred that metal ring 11 is rolled after step ST3 in order to reduce the thickness of the metal ring 11 to a given thickness and to be extended to a given circumference. Thereafter, in order to remove a strain, it is preferred that annealing of the metal ring 11 is performed in a nitrogen atmosphere or a reducing atmosphere at temperature of about 800~900° C. for about 5~30 minutes. Further, it is preferred that tension is applied to the annealed metal ring 11 to adjust the circumference to obtain the given circumference with high accuracy before performing aging treatment in step ST4.

Figure 8:
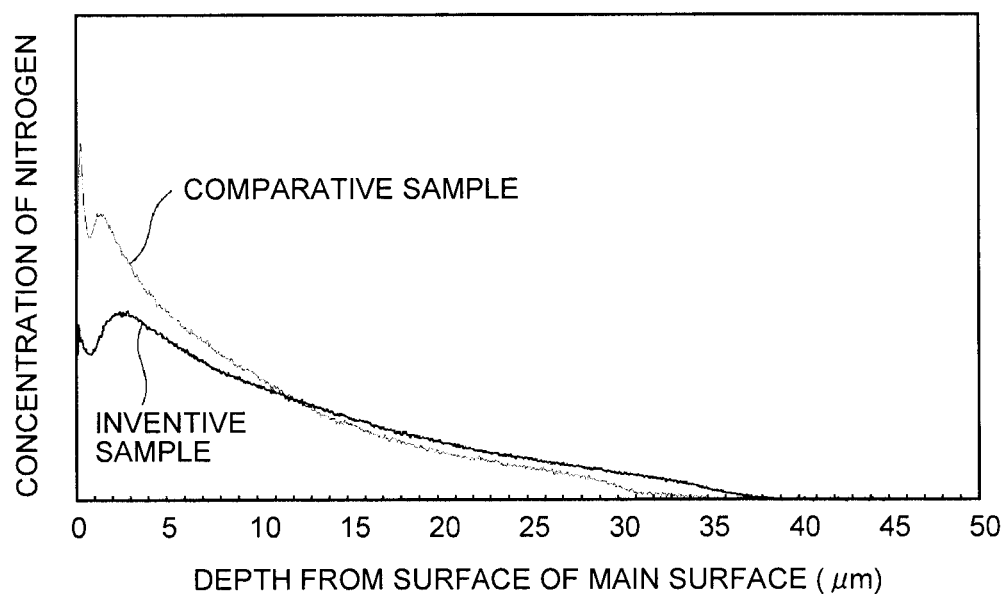
FIG. 8 is a graph showing a result of depth profiling of nitrogen by a glow discharge emission spectrophotometer, in a sample after aging treatment.

For an outer peripheral surface 11a of a nitrided sample after the series of preferred treatments are performed, depth profiling of nitrogen was performed by using a glow discharge emission spectrophotometer. FIG. 8 is a graph showing results of depth profiling of nitrogen by a glow discharge emission spectrophotometer, in the outer peripheral surfaces 11a of samples after aging treatment. An inventive sample shown in FIG. 8 is maraging steel to which 1 percent by mass of Cr is added as the foregoing nitrogen-affinitive metal. Meanwhile, a comparative sample shown in FIG. 8 is maraging steel that does not contain Cr. The rest of the conditions are the same.

For the purpose of homogenizing a welded part, annealing was also performed for the comparative sample under the same conditions as those of the annealing for forming the aforementioned concentrated layer of Cr. Since the comparative sample does not contain Cr, the concentrated layer of Cr is not formed in the comparative sample as a matter of course.

As shown in FIG. 8, in the inventive sample, a nitrogen concentration near the surface became lower than that of the comparative sample. Further, in the inventive sample, nitrogen atoms entered more deeply into it and the nitrided layer became thicker compared to the comparative sample. Accordingly, surface hardness of the outer peripheral surface 11a in the inventive sample became lower than surface hardness of the outer peripheral surface 11a in the comparative sample.

Table 1 collectively shows surface hardness and thicknesses of nitrided layers of the outer peripheral surfaces 11a, and surface hardness and thicknesses of nitrided layers of the end surfaces 11c in the comparative sample and the inventive sample. Surface hardness was measured by Micro Vickers hardness testing. A nitriding depth was measured by microstructure observation after nital etching.

In the comparative sample, the thickness of the second nitrided layer 12c of the end surface 11c is larger than the thickness of the first nitrided layer 12a of the outer peripheral surface 11a. Therefore, surface hardness of the end surface 11c is higher than surface hardness of the outer peripheral surface 11a.

On the other hand, in the inventive sample, the thickness of the second nitrided layer 12c of the end surface 11c is smaller than the thickness of the first nitrided layer 12a of the outer peripheral surface 11a. Nevertheless, surface hardness of the end surface 11c is higher than surface hardness of the outer peripheral surface 11a, and maintains equal hardness to that of the comparative sample.

Further, in the inventive sample, while the thickness of the first nitrided layer 12a of the outer peripheral surface 11a becomes larger than that of the comparative sample, surface hardness of the outer peripheral surface 11a in the inventive sample became lower than surface hardness of the outer peripheral surface 11a in the comparative sample. However, this is, on the contrary, favorable because, with such a structure, the outer peripheral surface 11a becomes less sensitive to fine flaws and inclusion that are generated inevitably in a manufacturing process.

As stated above, in the inventive sample, a concentration of Cr in the surface layer of the end surface 11c is higher than a concentration of Cr in the surface layer of the outer peripheral surface 11a. Therefore, in nitriding, more nitrogen atoms are trapped by Cr atoms near the surface layer of the end surface 11c, thereby achieving the thin and hard second nitrided layer 12c. At the same time, since Cr atoms are deficient near the surface layer in the outer peripheral surface 11a, nitrogen atoms enter inside more easily, thereby achieving the first nitrided layer 12a having a larger thickness and smaller hardness than the second nitrided layer 12c. As a result, it is possible to restrain fatigue fracture starting from end parts, and it is also possible to restrain deterioration of abrasion resistance of the end surface 11c. In the inventive sample, a fatigue endurance life improved by 1.6 times compared to the comparative sample.

Figure 9:
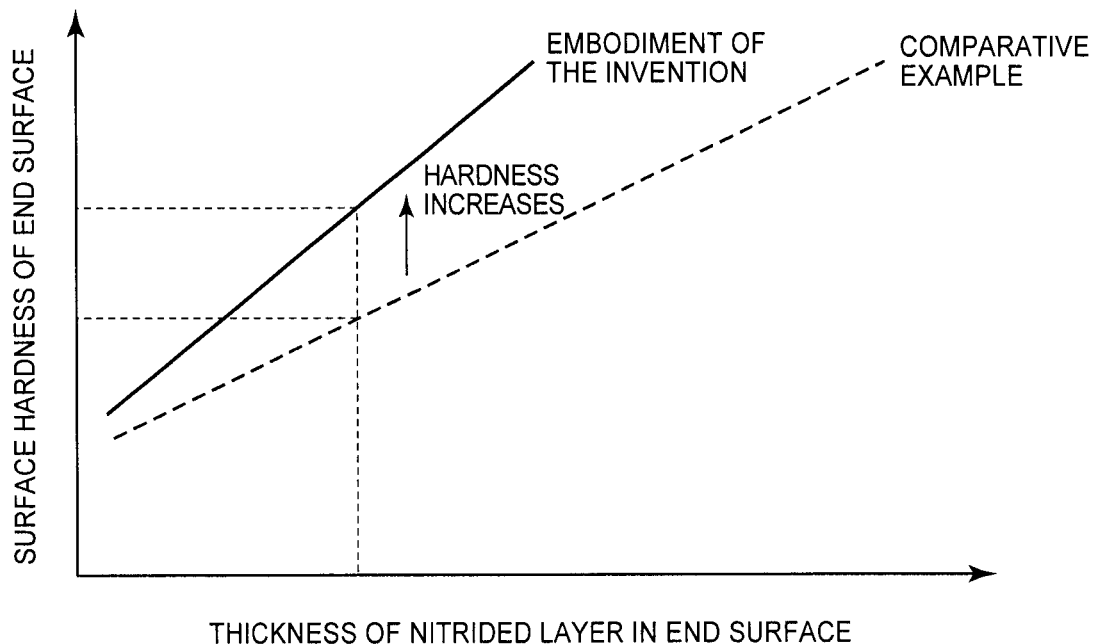
FIG. 9 is a graph showing a change of surface hardness of an end surface with respect to a thickness of a nitrided layer in the end surface.
Figure 10:
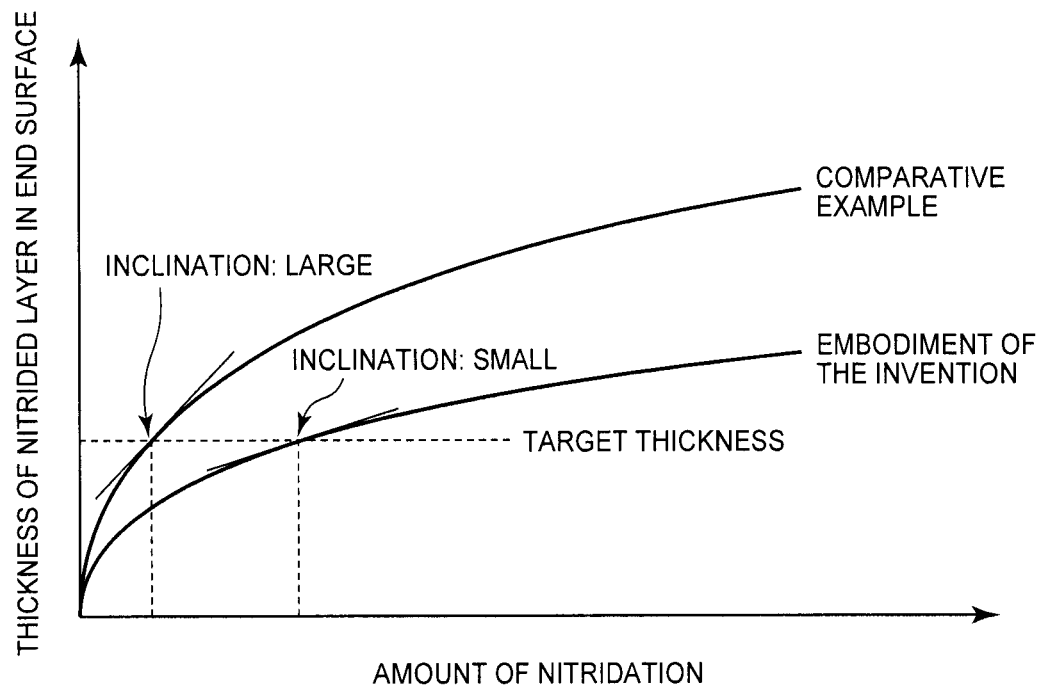
FIG. 10 is a graph showing a change of the thickness of the nitrided layer in the end surface with respect to an amount of nitridation.

<Superiority to the comparative example> Next, with reference to FIG. 9 and FIG. 10, superiority of this embodiment according to the disclosure to the comparative example described in International Unexamined Patent Application No. 2011/135624 is explained. FIG. 9 is a graph showing a change of surface hardness of the end surface with respect to a thickness of a nitrided layer of the end surface. FIG. 10 is a graph showing a change of the thickness of the nitrided layer with respect to an amount of nitridation. As shown in FIG. 9, the thickness of the nitrided layer and surface hardness are in a generally proportional relationship with each other. As shown in FIG. 10, the curve shows that the thickness of the nitrided layer saturates gradually as the amount of nitridation increases.

In a metal ring according to the comparative example, the thickness of the nitrided layer formed in the end surface is smaller than the thickness of the nitrided layer formed in the main surface because a nitriding inhibition film is formed in the end surface before nitriding. In short, the thickness of the nitrided layer is reduced by reducing the number of nitrogen atoms that enter from the end surface.

TABLE 1

|  | Outer peripheral surface | | End surface | |
| --- | --- | --- | --- | --- |
|  | Thickness of nitrided layer (μm) | Surface hardness (Hv) | Thickness of nitrided layer (μm) | Surface hardness (Hv) |
| Comparative sample | 30~32 | 880~900 | 33~35 | 950~980 |
| Inventive sample | 34~36 | 840~860 | 30~32 | 950~980 |

On the other hand, the metal ring according to this embodiment contains the nitrogen-affinitive metal such as Cr, which traps the nitrogen atoms. In short, in this embodiment according to the disclosure, the thickness of the nitrided layer is reduced by making nitrogen atoms trapped by nitrogen-affinitive metal so as to restrain the nitrogen atoms from entering inside.

Therefore, as shown by the broken line in FIG. 9, when comparison is made with the same thickness of the nitrided layer, more nitrogen atoms are contained in this embodiment according to the disclosure than the comparative example, thus increasing surface hardness. In short, in this embodiment according to the disclosure, even though the second nitrided layer of the end part is thin, it is possible to increase surface hardness of the end surface.

Further, as shown in FIG. 10, when comparison is made with the same amount of nitridation (an amount of reacted nitrogen), the thickness of the nitrided layer is larger in the comparative example than that of this embodiment according to the disclosure. Therefore, when comparison is made with the same thickness of the nitrided layer, inclination of thickness change of the nitrided layer with respect to the amount of nitridation becomes smaller in this embodiment according to the disclosure than that of the comparative example. In short, in this embodiment according to the disclosure, it is possible to obtain desired thickness of a nitrided layer and surface hardness more stably than the comparative example.

<Other embodiments> As stated so far, it is preferred that Cr and so on, which does not precipitate by aging, is added as the nitrogen-affinitive metal. However, Al and Ti, which are originally contained in maraging steel, may also be used as the foregoing nitrogen-affinitive metal. In this case, by either not performing aging treatment or making Al and Ti sub-aged in aging treatment, unprecipitated Al and Ti are used as trap sites for nitrogen during nitriding. On the other hand, in the case where aging treatment is not performed and sub-aging is performed, hardness is reduced. In order to make up for it, it is preferred that adding quantities of Mo and Co are increased in advance. However, Mo and Co are expensive. In this regard, addition of Cr and performing sufficient aging treatment are more preferred.

The claimed invention is not limited to the foregoing embodiments, and may be changed as necessary without departing from the gist of the invention.

What is claimed is:

1. A metal ring of a transmission belt in a belt-type continuously variable transmission, comprising:
    a first nitrided layer formed in a main surface of the metal ring; and
    a second nitrided layer formed in an end surface of the metal ring, wherein
    the metal ring contains maraging steel containing nitrogen-affinitive metal, and
    a concentration of the nitrogen-affinitive metal in a surface layer of the end surface is higher than a concentration of the nitrogen-affinitive metal in a surface layer of the main surface, and
    a thickness of the second nitrided layer is smaller than a thickness of the first nitrided layer, and surface hardness of the end surface of the metal ring is higher than surface hardness of the main surface of the metal ring.

2. The metal ring according to claim 1, wherein the containing nitrogen-affinitive metal that does not precipitate during aging treatment.

3. The metal ring according to claim 1, wherein the nitrogen-affinitive metal is Cr.

4. The metal ring according to claim 1, wherein the main surface of the metal ring includes an outer peripheral surface of the metal ring and an inner peripheral surface of the metal ring.

* * * * *